United States Patent [19]

Guzzoni

[11] Patent Number: 5,099,981
[45] Date of Patent: Mar. 31, 1992

[54] EQUIPMENT FOR MACHINING PIECES ON A PALLET BY MEANS OF A MACHINE TOOL WITH A SINGLE DEVICE FOR THE TRANSFER OF PALLETS BETWEEN A WORK STATION AND AN ADJACENT STATION FOR LOADING/UNLOADING THE PALLETS

[75] Inventor: Giorgio Guzzoni, Brescia, Italy
[73] Assignee: Salvagnini S.p.A., Sarego, Italy
[21] Appl. No.: 565,242
[22] Filed: Aug. 10, 1990
[30] Foreign Application Priority Data
Nov. 15, 1989 [IT] Italy .................. 22392 A/89
[51] Int. Cl.⁵ .......................................... B65G 37/00
[52] U.S. Cl. ........................ 198/346.1; 198/346.2; 29/33 P; 29/563
[58] Field of Search .......... 198/346.1, 346.2, 465.1; 29/33 P, 563

[56] References Cited
U.S. PATENT DOCUMENTS
4,449,277 5/1984 Hasegawa et al. .......... 198/346.1 X Primary Examiner—Joseph E. Valenza
Assistant Examiner—Tuan N. Nguyen
Attorney, Agent, or Firm—Cushman, Darby & Cushman

[57] ABSTRACT

Equipment for machining pieces on a pallet includes a work station, an adjacent station for the loading/unloading of pallets and a single device for transferring the pallets from the work station and the loading/unloading station. The work station includes a pallet-holding carriage which can slide horizontally on a fixed base and the loading/unloading station including two pallet-holding supports, one for receiving a pallet to be loaded with a piece to be machined and the other for receiving a pallet with a machined piece to be unloaded, at a distance from one another and parallel to the direction of sliding of the pallet-holding carriage. The transfer device includes an arm and a forearm articulated with respect to one another, mounted on a lateral appendix of the pallet-holding carriage and which can be operated so as to engage the pallet to be transferred and to move it from one to the other of the work and loading/unloading stations.

5 Claims, 5 Drawing Sheets

EQUIPMENT FOR MACHINING PIECES ON A PALLET BY MEANS OF A MACHINE TOOL WITH A SINGLE DEVICE FOR THE TRANSFER OF PALLETS BETWEEN A WORK STATION AND AN ADJACENT STATION FOR LOADING/UNLOADING THE PALLETS

BACKGROUND OF THE INVENTION

The present invention relates to an equipment for machining pieces on a pallet by means of a machine tool with a single device for the transfer of pallets between a work station and an adjacent station for loading/unloading the pallets.

A work station for machining pieces on machine tools for milling, drilling, reaming, etc., otherwise known as a work center, is substantially constituted by three main parts:

a lower part, which is a carriage sliding on a fixed base in a direction orthogonal to the axis of the tool-holding chuck of the machine tool which must machine the piece;

an intermediate part, known as a table, which can rotate on the carriage around a central vertical axis and which is made to rotate by an electric motor installed on the carriage and by a suitable mechanical transmission;

an upper part, known as a pallet, which during the machining stage is centered on the table and rigidly integral with it due to the effect of suitable clamping members and which can be disengaged from the table and slid suitably on it along suitable rectilinear guides.

The possibility of the sliding of the pallet on the table is used to transfer the pallet from the table to a support at the same level and provided with similar guides, external to the work center, and to subsequently transfer a new pallet to the table from a similar external support; there is thus accomplished a rapid change of pallets on the table and the operations of releasing and unloading from the pallet of the finished pieces and of loading on the pallet and of holding the pieces to be machined are executed outside the work center, while the latter carries out the machining stage, increasing productivity.

Habitually, the transfer of the pallet from the table to an external support and from the other external support to the table is executed automatically by two distinct transferrers, one incorporated in an external support and the other incorporated in the other external support; each of the two transferrers has its own electric motor, its own transmission of movement and its own electronic control of the movement.

Obviously, due to the displacement of the carriage on the base, the table first moves into line with the empty support, whose transferrer removes the pallet with the finished pieces, and then into line with the other support, whose transferrer delivers to it the pallet with the pieces to be machined.

SUMMARY OF THE INVENTION

The object of the present invention is to drastically reduce the complexity and the cost of the device for transferring the pallet to and from the table.

According to the invention, such object is attained with an equipment for machining pieces on a pallet by means of a machine tool, comprising a work station including a pallet-holding carriage which can slide horizontally on a fixed base, and an adjacent station for the loading/unloading of pallets including two pallet-holding supports, one for loading and the other for unloading, at a distance from one another and parallel to the direction of sliding of the pallet-holding carriage, characterized in that it comprises a single device for transferring the pallets from one to the other of the stations mounted on a lateral appendix of the pallet-holding carriage so that it is displaceable with said carriage between positions adjacent to one and to the other of the pallet-holding supports.

There are, moreover, preferably provided means capable of allowing the use of one motor only both for moving the pallet on to the work station carriage, that is, for the rotation of the table on the carriage itself, and for the operation of the transfer device.

The main economic advantage clearly originates in having reduced from two to one the number of transferrers, with the consequent simplification of the pallet-holding supports.

Another advantage consists on the other hand in having eliminated two motors and the corresponding control units.

The advantages of the invention are then that much greater, the more, according to the more advanced tendency, it is required to reduce the time of the transfer of the pallet, controlling along the entire path acceleration and speed and maintaining them at their optimum value at all times. In fact, for the latter more advanced performance, the cost of the control unit of the transferrer is high and the elimination of two control units is important; the table rotation control, which the present invention also uses for the transfer of the pallet, is already of the type which controls acceleration and speed, since the table of the work station is a numerically controlled axis.

BRIEF DESCRIPTION OF THE DRAWINGS

The features of the present invention shall be made more evident by the following detailed description of an embodiment illustrated as a non-limiting example in the enclosed drawings, wherein.

DETAILED DESCRIPTION

Figure 1:
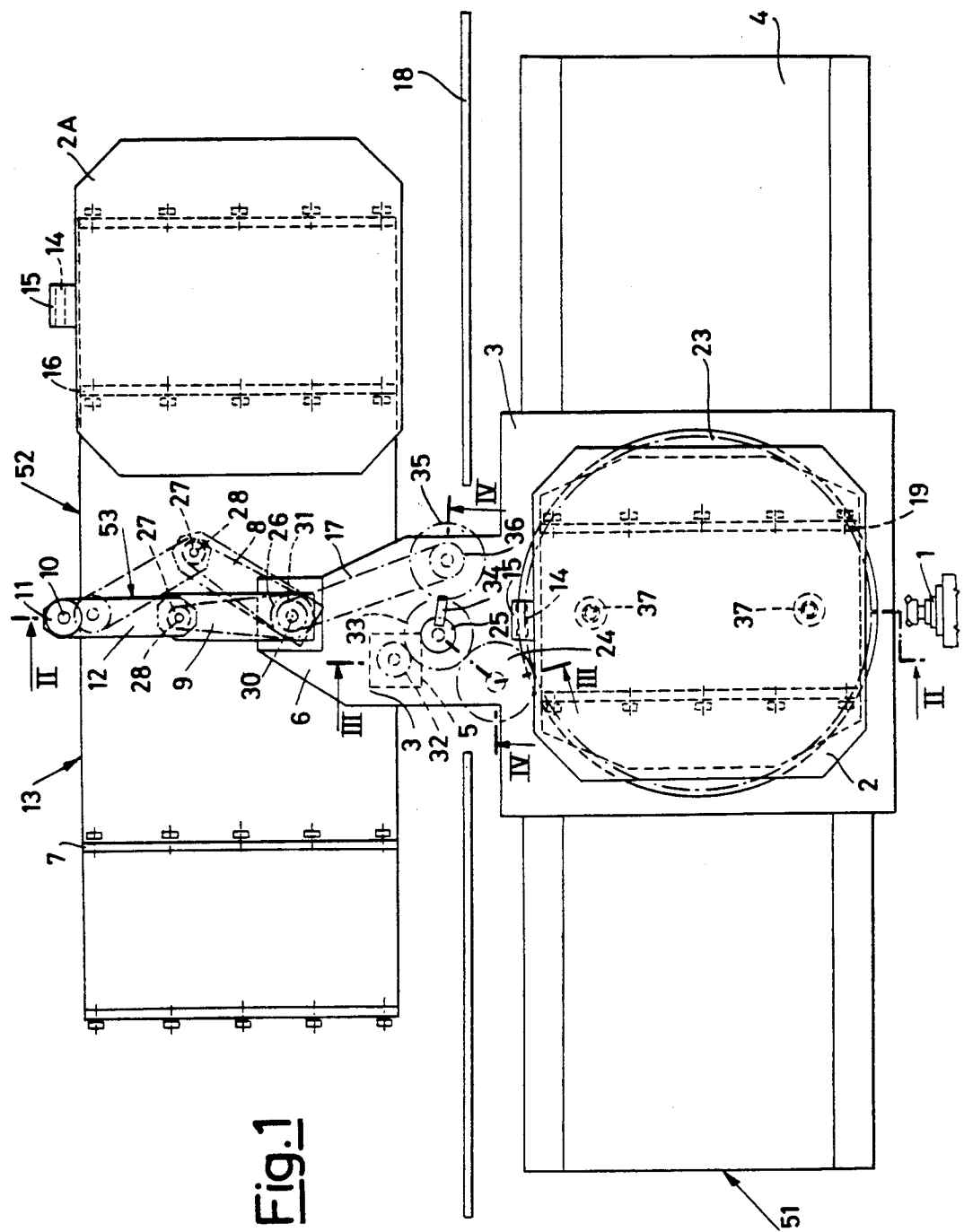
FIG. 1 shows a plan view of the equipment according to the invention in the position for machining a piece loaded on a pallet.
Figure 2:
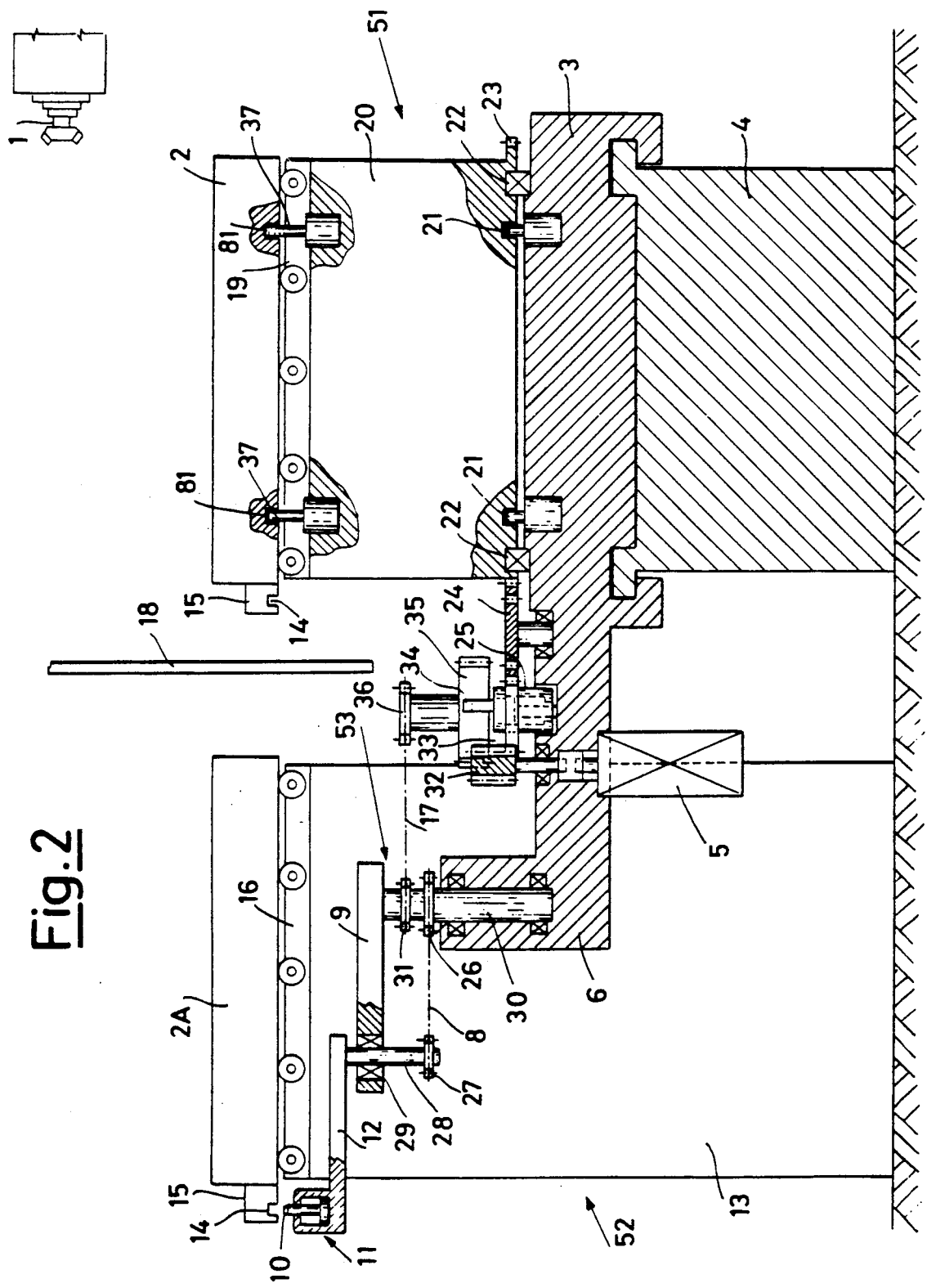
FIG. 2 shows a sectional view of the equipment taken along the line II—II of FIG. 1.

FIGS. 1 to 4 illustrate a work station or center 51 comprising a carriage 3 which slides horizontally on a base 4 in a direction orthogonal with respect to the axis of a tool-holding chuck 1 of a machine tool (not shown). There is a rotatably arranged on the carriage 3 a table 20 supported by bearings 22. Above table 20 there are slide guides 19, in particular a succession of idling rollers held by a fixed cage, for a pallet 2 provided with lower seats 81 for holding elements 37 suitable for holding pallet 2A to table 20.

Figure 3:
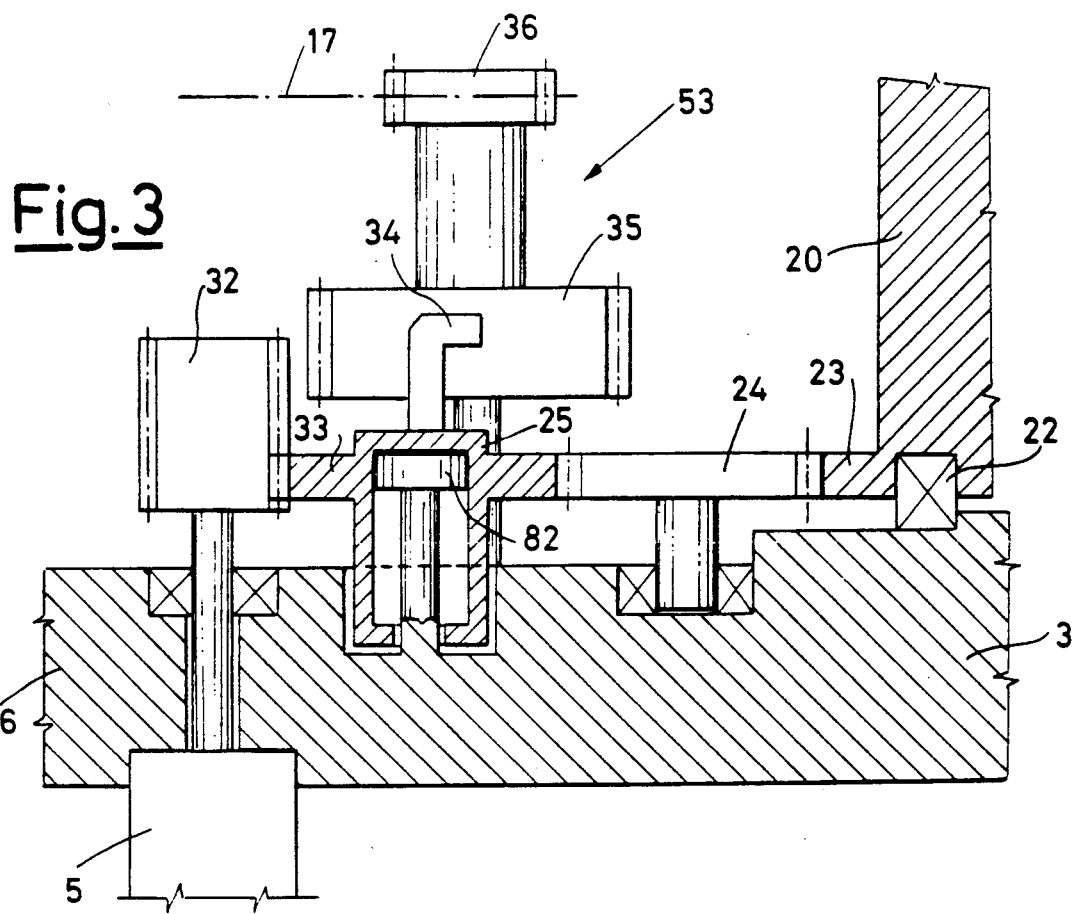
FIG. 3 shows a sectional view of an enlarged detail of the equipment taken along the line III—III of FIG. 1.
Figure 4:
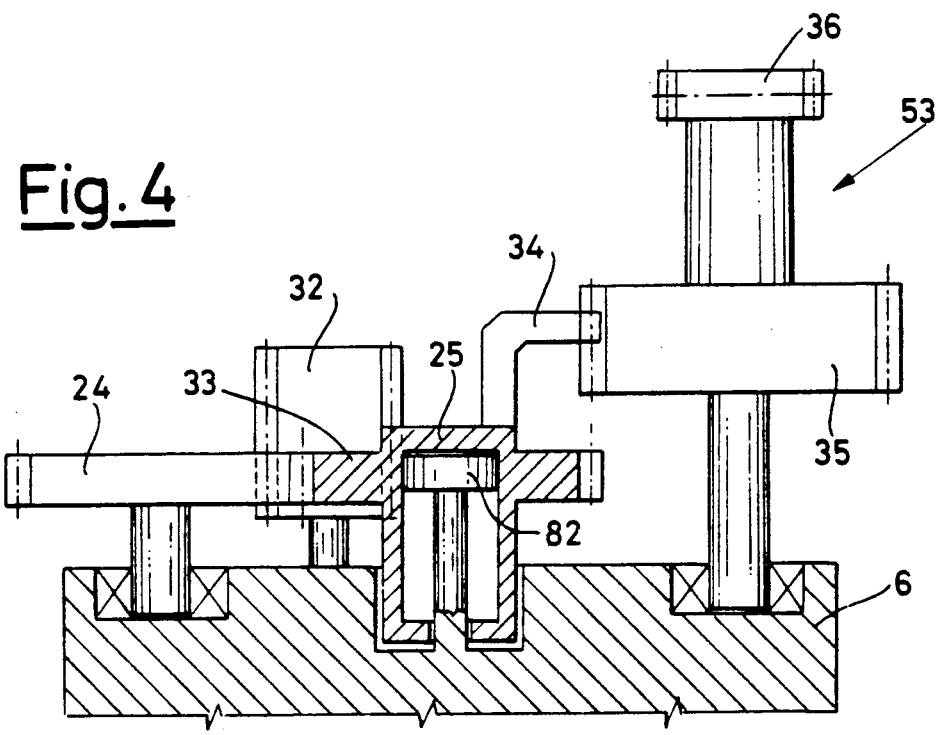
FIG. 4 shows a sectional view of the same enlarged detail taken along the line IV—IV of FIG. 1.

To an appendix 6 of carriage 3 there is fastened an electric motor 5 with whose shaft pinion 32 is integral. Pinion 32 transmits movement to a toothed wheel 33, vertically mobile through a hydraulic cylinder 25 co-operating with a piston 82, suitable for arranging itself in a high position or in a low position (FIGS. 3 and 4). In both positions, toothed wheel 33 meshes with pinion 32 which has a sufficiently wide-toothed band.

The toothed wheel 33, when it is in the low position, meshes with a toothed wheel 24 which, in turn, meshes with a toothed wheel 23 integral with table 20. However, when it is in the high position, the toothed wheel 33 meshes with a toothed wheel 35.

A series of holding elements 21, inserted in the lower part of table 20 (FIG. 2), prevents the rotation of table 20 and of toothed wheel 24 connected to it, when toothed wheel 33 is in a high position.

A small tooth 34, integral with hydraulic cylinder 25, prevents the rotation of toothed wheel 35 when toothed wheel 33 is in a low position. When toothed wheel 33 moves to a high position, the small tooth 34 also moves upwards and disengages itself from toothed wheel 35 a few millimeters after toothed wheel 35 has begun to engage with toothed wheel 35; in this way toothed wheel 35 is never abandoned.

The toothed wheel 35 is integral and coaxial with a toothed wheel 36 which is connected through a chain 17 to a toothed wheel 31 integral with shaft 30 which is freely rotatable on appendix 6 of carriage 3.

On shaft 30, there is mounted a device for the transfer of pallet 53, which comprises an arm 9 fastened on shaft 30. The toothed wheel 31 is integral and coaxial with arm 9 and its shaft 30. The arm 9 houses, at the extremity opposite its axis of rotation, a bearing 29, which rotatably supports a vertical shaft 28 on which a forearm 12 is fastened.

There is fastened to forearm 12, at the extremity opposite its axis of rotation 28, a cylinder (pneumatic or hydraulic) 11 used to control a coupling pin 10 which may engage a groove 14 of an appendix 15 of pallet 2 and 2A.

A toothed wheel 26 fastened to shaft 30 is connected by means of a chain 8 to a toothed wheel 27 fastened to shaft 28 and thus integral with forearm 12.

The ratio between the primitive diameters of toothed wheels 26 and 27 is two; thus one rotation, say clockwise, of arm 9 corresponds to an anticlockwise rotation of twice the angle of forearm 12. The distance between the axis of shaft 30 and the axis of shaft 28 is, in turn, equal to the distance between the axis of shaft 28 and the axis of cylinder 11; thus, when arm 9 is rotated and as a consequence forearm 12, pin 10 moves through a rectilinear path along a straight line passing through the axis of rotation of arm 30. When the members described above are suitably arranged, pin 10 is thus in a position of moving along a segment, having a length which is four times the distance between the axis of shaft 30 and the axis of shaft 28, oriented in the direction in which the transfer of the pallet is required to be executed, that is, orthogonally to the direction of movement of carriage 3 on base 4 and parallel to guides 19 of carriage 3.

The loading/unloading station 52 comprises a single door-type structure 13 to which two pairs of guides 16, 7 are fastened, suitable for supporting the pallet with the pieces to be machined waiting to be transferred to table 20 and the pallet with the machined pieces coming from the work station 51, respectively.

A mobile protection enclosure 18 is provided during the machining of the piece (FIGS. 1 and 2) to separate the work station, where there are chips and machining fluid, from the external supports.

The equipment described operates as follows.

With reference to FIG. 1, initially, a pallet 2A with one or more pieces to be machined is supported on guides 16 at the loading/unloading station 52, while another pallet 2 is held at work station 51 on table 20 with the piece being machined with the tool mounted on chuck 1. If the machining of the piece requires rotations of table 20, the vertically mobile toothed wheel 33 is put in a low position and electric motor 5 can transmit movement to the toothed crown 23 integral with table 20. The hydraulic cylinder 11 is parked just outside the mobile protection enclosure 18 in an area such as not to interfere with the structure 13 if carriage 3 moves along the base 4.

When the machining of the piece which is on pallet 2 fastened to table 20 is over, the table rotates until it orients sliding guides 19 in a position parallel to guides 7 at loading/unloading station 52.

At the same time, carriage 3, suitably controlled by means not shown, translates until it aligns sliding guides 19 with guides 7.

At the same time, the mobile protection enclosure 18 moves away to leave a free passage.

When the operation is over, holding elements 21 clamp table 20.

The vertically mobile toothed wheel 31 moves to a high position, thus connecting electric motor 5 with wheel 35. From this moment, the rotation of motor 5, through toothed wheels 32, 33, 35, 36, 31, 26 and 27 which cause arm 9 and forearm 12 to rotate in an appropriate manner, causes the translation of cylinder 11 and of pin 10 connected to it.

Figure 5:
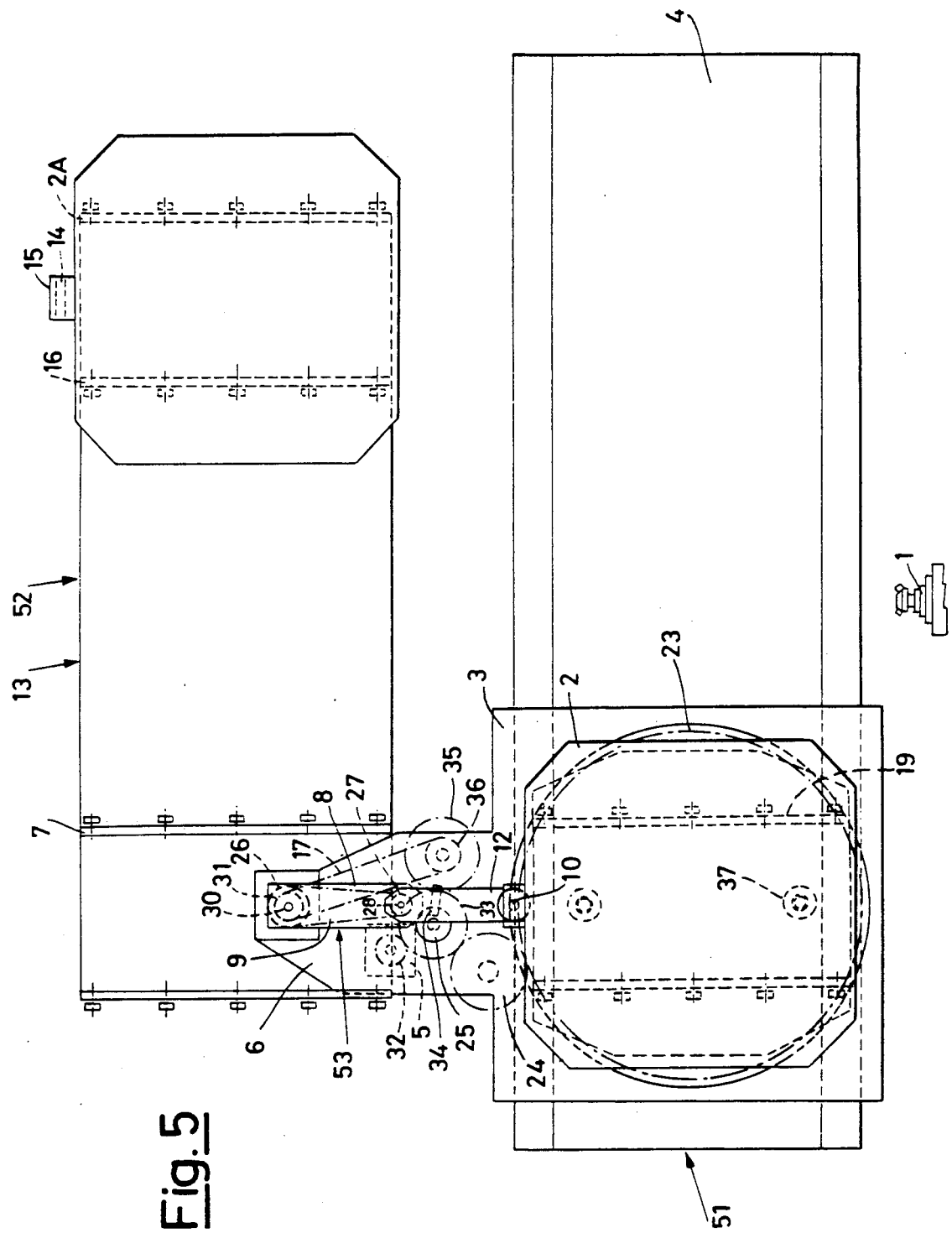
FIGS. 5 and 6 show a plan view of the equipment, in the positions of start of unloading and of start of loading, respectively, of a pallet.

Pin 10 moves under groove 14 of pallet 2 on table 20 (FIG. 5) and then rises, inserting itself in groove 14.

The holding elements 37 of pallet 2 on table 20 release pallet 2. Pin 10 transfers pallet 2 to guides 7. Pin 10 moves downwards, disengaging itself from groove 14. Cylinder 14 partially retracts pin 10 to avoid interferences with structure 13.

Figure 6:
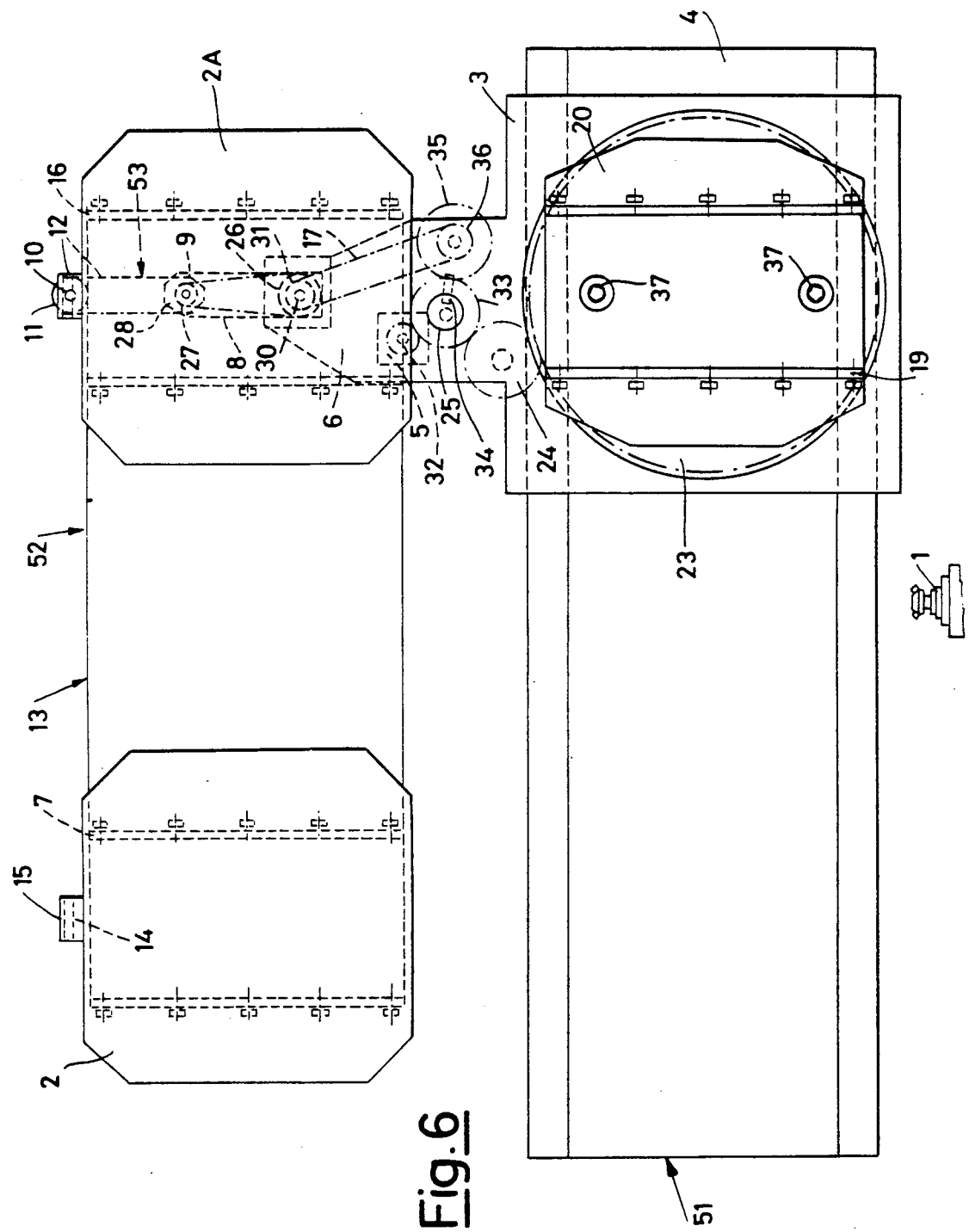

Carriage 3 then translates until sliding guides 19 are opposite guides 16 (FIG. 6) where pallet 2A with the piece to be machined is waiting to be transferred to work station 51. Cylinder 11 moves under groove 14 of pallet 2A. Pin 10 moves upwards and inserts itself in groove 14. Under the control of arm 9 and forearm 12 pin 10 transfers pallet 2A on sliding guides 19 of table 20. Pin 10 lastly moves downwards disengaging itself from groove 14.

Holding elements 37 hold pallet 2A. At the same time carriage 3 moves back into the work position of FIG. 1 and the mobile protection enclosure 18 returns to its initial position.

I claim:

1. Equipment for machining pieces on a pallet by means of a machine tool, comprising:
    a fixed base;
    a work station including a pallet-holding carriage which is arranged to be horizontally slid in a direction on said fixed base;
    a pallet-holding table rotatably mounted on said carriage;
    an adjacent station for the loading/unloading of pallets including two pallet-holding supports, one for loading and the other for unloading, at a distance from one another and parallel in said direction of sliding of the pallet-holding carriage; and
    a single device for transferring the pallets from one to the other of said stations mounted on a lateral appendix of the pallet-holding carriage so that it is displaceable with said carriage between loading and unloading positions respectively coincident with respective ones of said pallet-holding supports.

2. Equipment according to claim 1, characterized in that said carriage is provided with one motor only, said motor being in a position to control alternatively the rotation of the pallet-holding table mounted on the pallet-holding carriage and the operation of device for the transfer of the pallet between said loading/unloading station and said work station.

3. Equipment according to claim 2, characterized in that said motor can be coupled alternatively to the pallet-holding table and to the transfer device by means of a control pinion and a toothed wheel for transmitting the movement which can be displaced along the axis of pinion between a first position in which it is simultaneously engaged with control means of the rotation of the pallet-holding table and a second position in which it is engaged with control means of the transfer device.

4. Equipment according to claim 1, characterized in that said transfer device comprises an arm rotatably supported by said appendix of the pallet-supporting carriage and a forearm rotatably supported by said arm and carrying a cylinder for the operation of a pin which can be inserted in a groove of an appendix of the pallet for its transfer between said work stations and the loading/unloading station.

5. Equipment according to claim 4, characterized in that said arm and said forearm have the same length and said control means comprise first means for controlling the rotation of said arm and second means for controlling a counter rotation of said forearm of an amplitude twice that of said arm, so that said pin may move back and forth along a straight line passing through the axis of rotation of said arm.

* * * * *